(12) United States Patent
Shirokoshi

(10) Patent No.: US 12,491,571 B2
(45) Date of Patent: Dec. 9, 2025

(54) GEAR SKIVING PROCESS METHOD

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 513 days.

(21) Appl. No.: 18/027,153

(22) PCT Filed: Dec. 28, 2020

(86) PCT No.: PCT/JP2020/049239
§ 371 (c)(1),
(2) Date: Mar. 20, 2023

(87) PCT Pub. No.: WO2022/145013
PCT Pub. Date: Jul. 7, 2022

(65) Prior Publication Data
US 2023/0330763 A1  Oct. 19, 2023

(51) Int. Cl.
*B23F 5/16* (2006.01)

(52) U.S. Cl.
CPC .................... *B23F 5/163* (2013.01)

(58) Field of Classification Search
CPC .......... B23F 5/163; B23F 5/205; B23F 15/06; B23F 17/006; B23F 19/102; B23F 19/104;
(Continued)

(56) References Cited

U.S. PATENT DOCUMENTS

| 2,121,840 A | 6/1938 | Everard |
| 8,819,936 B2 * | 9/2014 | Nagata ..................... C21D 9/32 409/12 |

(Continued)

FOREIGN PATENT DOCUMENTS

| DE | 102016113512 A1 | 1/2018 |
| DE | 102018004241 A1 | 11/2019 |

(Continued)

OTHER PUBLICATIONS

International Search Report (PCT/ISA/210) with English translation and Written Opinion (PCT/ISA/237) mailed on Mar. 9, 2021, by the Japanese Patent Office as the International Searching Authority for International Application No. PCT/JP2020/049239.

*Primary Examiner* — Nicole N Ramos
(74) *Attorney, Agent, or Firm* — BUCHANAN INGERSOLL & ROONEY PC

(57) ABSTRACT

In a gear skiving process method, a tooth-cutting process is performed on a surface to be cut of a workpiece using a first skiving cutter disposed at a first processing position on the surface to be cut and a second skiving cutter disposed at a second processing position set apart by 180° in a circumferential direction from the first processing position. Parts that are to be right tooth flanks of internal teeth to be created in the surface to be cut of the workpiece are cut mainly by the first skiving cutter. Additionally, parts that are to be left tooth flanks are cut mainly by the second skiving cutter. Conditions of the processing performed using the first and second skiving cutters can be controlled individually and teeth having a shape in which the left and right tooth flanks are different can be processed efficiently.

1 Claim, 4 Drawing Sheets

(58) Field of Classification Search
CPC ........ B23F 21/005; B23F 21/16; B23F 23/06; B23F 23/1243; B23Q 2230/006; B23Q 39/048
See application file for complete search history.

(56) References Cited

U.S. PATENT DOCUMENTS

| | | | |
|---|---|---|---|
| 2014/0234043 A1* | 8/2014 | Nakahara | B23F 5/20 409/12 |
| 2015/0063927 A1* | 3/2015 | Sjoo | B23F 5/163 407/115 |
| 2016/0158861 A1* | 6/2016 | Kleinbach | B23F 19/10 409/8 |
| 2017/0014922 A1* | 1/2017 | Ellicott | B23F 5/163 |
| 2019/0076945 A1* | 3/2019 | Schmezer | B23F 19/125 |

FOREIGN PATENT DOCUMENTS

| | | | | |
|---|---|---|---|---|
| JP | S6379120 U | * | 5/1988 | |
| JP | 2013063506 A | | 4/2013 | |
| JP | 2020019096 A | | 2/2020 | |
| WO | WO-2019011871 A1 | * | 1/2019 | ............ B23F 21/005 |

\* cited by examiner

GEAR SKIVING PROCESS METHOD

TECHNICAL FIELD

The present invention relates to a gear skiving process method in which a tooth-cutting process is performed using a skiving cutter (gear-type tool) on a surface to be cut of either an external peripheral surface or an internal peripheral surface of a cylindrical workpiece (gear to be cut).

BACKGROUND ART

Gear skiving process methods are known as process methods for cutting teeth into internally toothed gears and externally toothed gears. In a gear skiving process method, an axial angle is held between a rotation axis of a workpiece (gear to be cut) and a rotation axis of a tool, in which state the tool is fed in the axial direction of the workpiece while both the workpiece and the tool are caused to rotate at a rotation ratio corresponding to a gear ratio.

FIG. 4(a) is a diagram of an example of how a workpiece for an internally toothed gear is processed by a skiving cutter in a gear skiving process. In this skiving process, a skiving cutter 1 is disposed such that a rotation axis 1a thereof forms a predetermined crossing angle (axis crossing angle) with a rotation axis 3a of a workpiece 3 (internally toothed gear to be cut). The skiving cutter 1 is positioned at a predetermined processing position in a circumferential direction on a surface 31 to be cut (circular internal peripheral surface) of the workpiece 3. The workpiece 3 and the skiving cutter 1 are caused to rotate synchronously in the same direction. In this state, the skiving cutter 1 is fed along the surface 31 to be cut of the workpiece 3 in the direction of the rotation axis 3a of the workpiece. Internal teeth 32 are thereby formed in the surface 31 to be cut of the workpiece 3 by cutting edges 1b of the skiving cutter 1. As is widely known, a shape of the cutting edges of the skiving cutter 1, a torsion angle, an axis crossing angle between the skiving cutter 1 and the workpiece 3, respective rotation speeds of the skiving cutter 1 and the workpiece 3, a feed rate of the skiving cutter 1, a depth of cut, and other processing conditions are appropriately set in accordance with a tooth profile to be created.

FIG. 4(b) is a schematic depiction simplifying the skiving cutter 1 and the workpiece 3 shown in FIG. 4(a). The skiving cutter and the workpiece are similarly simplified in the drawings (FIGS. 1-3) described below.

In the skiving process method described in Patent Document 1, a tooth-cutting process is performed twice on a workpiece using the same skiving tool, and a process of finishing a right tooth flank and left tooth flank to be created is performed in a separate step. In a gear-processing method described in Patent Document 2, a tooth-cutting process is performed while a skiving cutter is moved along an axial direction and a circumferential direction of a material to be cut, and it is possible to create a tooth profile in which a tooth flank shape changes in a tooth trace direction and a tooth profile in which a tooth depth changes in the tooth trace direction.

PRIOR ART LITERATURE

Patent Documents

[Patent Document 1] JP 2013-63506 A
[Patent Document 2] JP 2020-19096 A

DISCLOSURE OF THE INVENTION

Problems to be Solved by the Invention

In a gear skiving process, when a left tooth flank and a right tooth flank are simultaneously cut by a skiving cutter, a tooth-cutting process cannot be performed on a gear in which the left and right tooth flanks have different shapes. With regard to the left and right tooth flanks to be cut, processing accuracy is poorer on the tooth flank where a rake angle is negative (obtuse) than on the tooth flank on the opposite side where the rake angle is acute.

In view of the foregoing, it is an object of the present invention to provide a gear skiving process method with which it is possible to efficiently cut the teeth of a gear having a tooth profile such as one that changes along the tooth trace direction or one having different left and right tooth flanks.

Means Used to Solve the Problems

To solve the problems described above, the present invention relates to a gear skiving process method in which a tooth-cutting process is performed on a surface to be cut, which is either an external peripheral surface or an internal peripheral surface of a cylindrical workpiece, the gear skiving process method characterized in that:
  a first skiving cutter is positioned at a first processing position in a circumferential direction on the surface to be cut of the workpiece such that a predetermined depth of cut is achieved;
  a second skiving cutter is positioned at a second processing position set apart by a predetermined angle in the circumferential direction from the first processing position on the surface to be cut such that a predetermined depth of cut is achieved;
  the first skiving cutter is disposed so as to be at a first axis crossing angle in relation to the workpiece, and the second skiving cutter is disposed so as to be at a second axis crossing angle in relation to the workpiece;
  while the workpiece and the first and second skiving cutters are caused to rotate synchronously, the first and second skiving cutters are simultaneously fed in a direction of a rotation axis of the workpiece and a tooth-cutting process is performed on the surface to be cut; and
  in the tooth-cutting process, the first skiving cutter cuts either one set of left tooth flanks and right tooth flanks of teeth to be created in the surface to be cut, and the second skiving cutter cuts the other set of the left tooth flanks and the right tooth flanks.

In the method of the present invention, a tooth-cutting process is performed on the workpiece using two skiving cutters. When the tooth-cutting process is performed in one step, one set of tooth flanks, either the left or right, of the teeth to be created are processed by the first skiving cutter and the other tooth flanks are cut by the second skiving cutter. Teeth having a tooth profile in which the left and right tooth flanks are asymmetrical can be efficiently cut via a tooth-cutting process composed of one step.

The tooth-cutting process can also be performed in two steps. In this case, processing conditions are set and the one set of tooth flanks is cut such that, for example, cutting edges of the first skiving cutter form an acute rake angle with the one set of tooth flanks among the tooth flanks on both sides of the teeth to be created in the surface to be cut of the workpiece. In the subsequent step, processing conditions are set and the other set of tooth flanks are cut such that cutting edges of the second skiving cutter form an acute rake angle with the other set tooth flanks. As a result, both sets of tooth flanks can be cut with precision.

It is possible to process the left and right tooth flanks into different profiles by setting the axis crossing angles between the workpiece and the first and second skiving cutters to mutually different angles. By changing the axis crossing angles between the workpiece and the first and second skiving cutters partway through processing, it is possible to change pressure angles from partway along the tooth trace direction. A three-dimensional tooth profile having symmetric tooth flanks in which the pressure angle changes along the tooth trace direction or asymmetric tooth flanks is thereby obtained. In addition, a tapering tooth profile (three-dimensional tooth profile) in which a tooth depth changes along the tooth trace direction is obtained by changing the amount by which the first and second skiving cutters are fed in a radial direction.

MODE FOR CARRYING OUT THE INVENTION

Figure 1A:
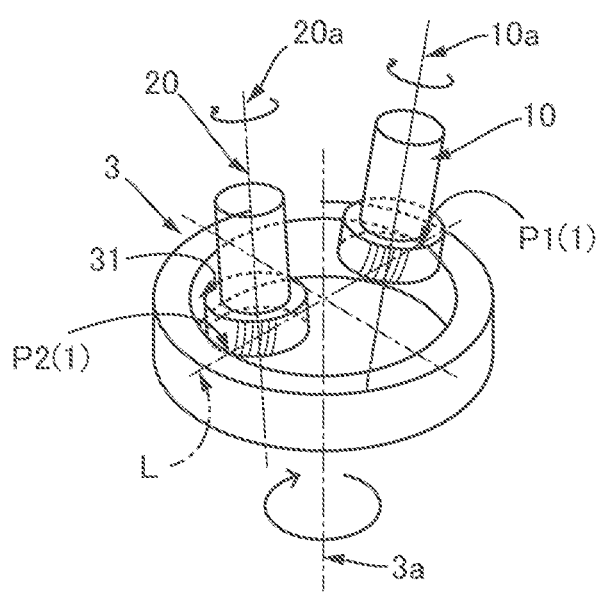
FIG. 1(a) is a diagram of an example of how a workpiece for an internally toothed gear is processed by first and second skiving cutters in a step of coarse processing performed on the workpiece, 1(b) is a diagram of an axis crossing angle, a rotation direction, a left tooth flank, and a right tooth flank, 1(c) is a diagram showing how the first skiving cutter is arranged with respect to a surface to be cut when seen from a direction along a workpiece diameter line passing through a center of the first skiving cutter, and 1(d) is a diagram showing how the second skiving cutter is arranged with respect to the surface to be cut when seen from the direction along the workpiece diameter line passing through a center of the second skiving cutter.
Figure 1B:
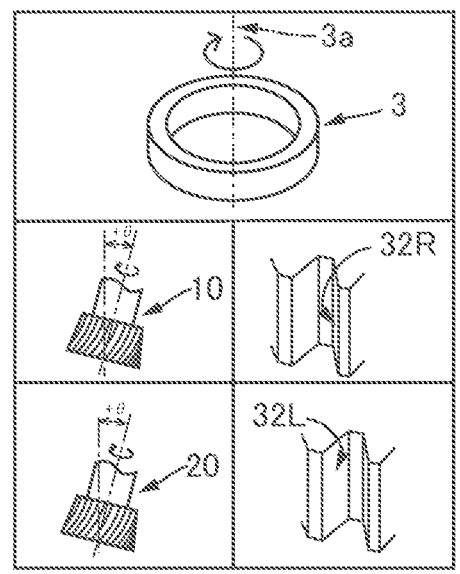
Figure 1C:
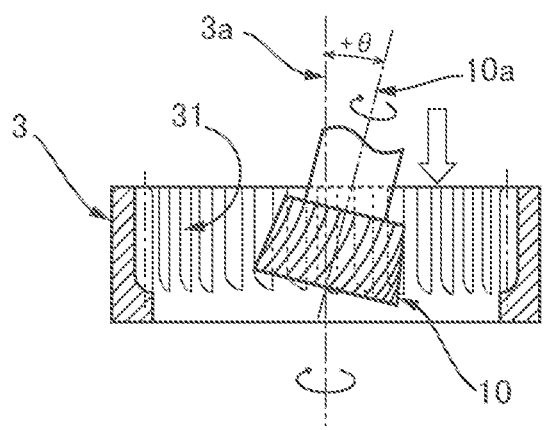
Figure 1D:
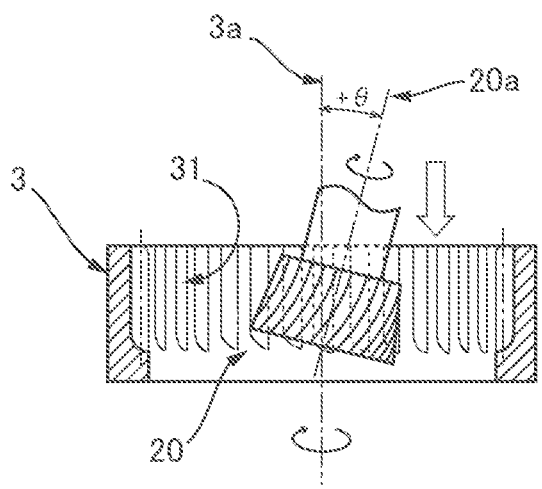

An embodiment of a tooth-cutting process using the gear skiving process method of the present invention is described below with reference to the drawings. The example below is a method for processing an internally toothed gear using the gear skiving process method of the present invention.

A workpiece for an internally toothed gear is obtained via, for example, a material-forging step and a turning step. Internal teeth (tooth grooves) are processed into a circular internal peripheral surface, which is a surface to be cut, of the workpiece via a coarse processing step (first tooth-cutting step). The workpiece is then subjected to a step such as a heat treatment, after which left tooth flanks and right tooth flanks of the internal teeth are finished in a finishing step (second tooth-cutting step). The gear skiving process of the present invention is used in the coarse processing step and the finishing step.

The coarse processing step shall be described with reference to FIGS. 1(a)-(d). A first skiving cutter 10 is positioned at a first processing position P1(1) in a circumferential direction on a surface 31 to be cut of the workpiece 3. In addition, a second skiving cutter is positioned at a second processing position P2(1) set apart by 180° in the circumferential direction from the first processing position P1(1) on the surface 31 to be cut. In other words, the first and second skiving cutters 10, 20 are disposed in opposing positions facing each other on either side of a rotation axis 3a of the workpiece 3.

For example, cutters having the same configuration are used as the first and second skiving cutters 10, 20. In addition, rotation axes 10a, 20a of the first and second skiving cutters 10, 20 are inclined in relation to the rotation axis 3a of the workpiece 3 in the same direction and by the same angle. In other words, if an axis crossing angle (first axis crossing angle) between the first skiving cutter 10 and the workpiece 3 is denoted as θ, an axis crossing angle (second axis crossing angle) between the second skiving cutter 20 and the workpiece 3 is θ as well. The workpiece 3 and the first and second skiving cutters 10, 20 all rotate clockwise.

In this case, with the first skiving cutter 10, parts where right tooth flanks 32R of internal teeth 32 are to be formed are cut mainly by edge tip parts of cutting edges that come into contact with the surface 31 to be cut of the workpiece 3 at an acute rake angle. By contrast, with the second skiving cutter 20, parts where left tooth flanks 32L of the internal teeth 32 are to be formed are cut mainly by edge tip parts of cutting edges that come into contact with the surface 31 to be cut at an obtuse rake angle.

The first and second skiving cutters 10, 20 are, in the circumferential direction of the workpiece, placed in positions separated in a direction along the rotation axis 3a from the surface 31 to be cut, in relation to the first and second processing positions P1(1), P2(2), which are on a diameter line L. The first and second skiving cutters 10, 20 are caused to rotate synchronously in the same direction as the rotation direction of the workpiece 3. The first and second skiving cutters 10, 20 are positioned in a workpiece diameter direction such that a predetermined depth of cut is achieved. In this state, the surface 31 to be cut of the workpiece 3 is cut while the skiving cutters are moved in relation to the surface 31 to be cut at a predetermined speed in the direction along the rotation axis 3a of the workpiece 3, thus creating the tooth grooves of the internal teeth 32. Parts that will be the right tooth flanks 32R of the internal teeth 32 are cut mainly by the first skiving cutter 10, and parts that will be the left tooth flanks 32L of the internal teeth 32 are cut mainly by the second skiving cutter 20.

Figure 2A:
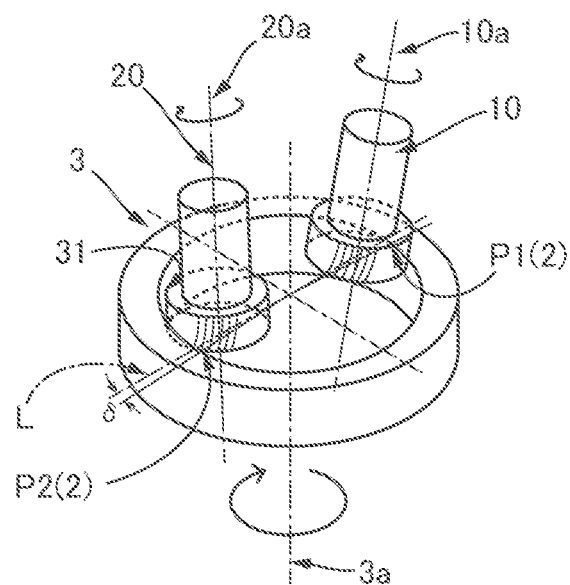
FIG. 2(a) is a diagram of an example of how a workpiece is processed by the first and second skiving cutters in a finishing step, and 2(b) is a diagram of right tooth flanks and left tooth flanks formed in the surface to be cut of the workpiece.

The tooth flank finishing step, which is a second tooth-cutting step, shall next be described with reference to FIGS. 2(a) and (b). In the tooth flank finishing step, a finishing process is carried out using the first skiving cutter 10 mainly on the right tooth flanks 32R of the internal teeth 32 created in the coarse processing step in the surface 31 to be cut. At the same time, a finishing process is carried out using the second skiving cutter 20 mainly on the other left tooth flanks 32L.

In the finishing process as well, the axis crossing angle between the first skiving cutter 10 and the workpiece 3 is set to θ, and the axis crossing angle between the second skiving cutter 20 and the workpiece is set to the same θ. In the finishing step, the processing position of the first skiving cutter 10 is changed to a first processing position P1(2), which is moved clockwise by a minute angle δ from the first processing position P1(1) on the diameter line L in the first tooth-cutting step, as shown in FIG. 2(a). The processing position of the second skiving cutter 20 is changed to a second processing position P2(2), which is moved counterclockwise in the circumferential direction by the same angle δ from the second processing position P2(1) on the diameter line L in the first tooth-cutting step. The amount of movement is extremely small, but is exaggerated in the drawing.

Figure 2B:
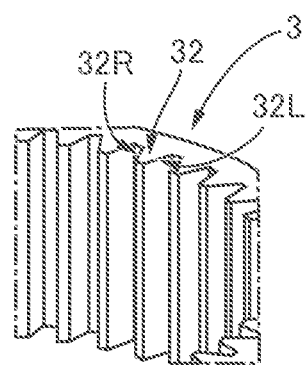

In this state, the finishing process is carried out on the left and right tooth flanks 32R, 32L while the workpiece 3 and the first and second skiving cutters 10, 20 are caused to rotate synchronously and the first and second skiving cutters 10, 20 are fed in the direction of the rotation axis 3a of the workpiece 3. FIG. 2(b) is a diagram of an enlarged view of the internal teeth 32 formed in the surface 31 to be cut of the workpiece 3. The process of finishing the right tooth flanks 32R of the internal teeth 32 is carried out mainly by the first skiving cutter 10. The process of finishing the left tooth flanks 32L on the opposite sides is carried out mainly by the second skiving cutter 20.

In the gear skiving process method of the present example, the feed rate of the first and second skiving cutters 10, 20, the depth of cut, and other processing conditions can be independently controlled. Therefore, it is possible to process internal teeth having asymmetrical left and right tooth flanks. For example, in the first and second tooth-cutting processes, the axis crossing angles of the first and second skiving cutters 10, 20 are changed partway through processing, so that pressure angles of the left and right tooth flanks can be changed from partway along the tooth trace direction. It is thereby possible to process a three-dimensional tooth profile in which the pressure angles of the left and right tooth flanks change in a symmetrical manner along the tooth trace direction. It is also possible to process a three-dimensional tooth profile in which the pressure angles of the left and right tooth flanks change in an asymmetrical manner along the tooth trace direction. Furthermore, by changing the radial feed amount (depth of cut) of the first and second skiving cutters 10, 20, it is possible to process a gear having a tooth profile in which the left and right tooth flanks are different.

According to the method of the present example, using the two first and second skiving cutters 10, 20 makes it possible for the processing time to be shorter than when a single cutter is used. In addition, edge tip wear of the cutting edges of the cutters 10, 20 can be minimized, and the life of the cutters 10, 20 can be extended.

Modifications

In the example described above, simultaneous processing is carried out on the surface 31 to be cut of the workpiece 3 by the first and second skiving cutters 10, 20 in both the coarse processing step and the finishing step. These steps can each be two steps: a process using the first skiving cutter 10 and a process using the second skiving cutter 20.

FIG. 3 is a diagram of a two-step process of cutting teeth into an internally toothed gear. In the coarse processing step, the first skiving cutter 10 is positioned at the first processing position P1(1) in the circumferential direction on the surface 31 to be cut of the workpiece 3, as shown in FIG. 3(a). The second skiving cutter 20 is positioned at the second processing position P2(1), which is set apart by a 180° angle in the circumferential direction from the first processing position P1(1) on the surface 31 to be cut. In other words, the first and second skiving cutters 10, 20 are disposed in opposing positions with the rotation axis 3a of the workpiece 3 therebetween.

Figure 3A:
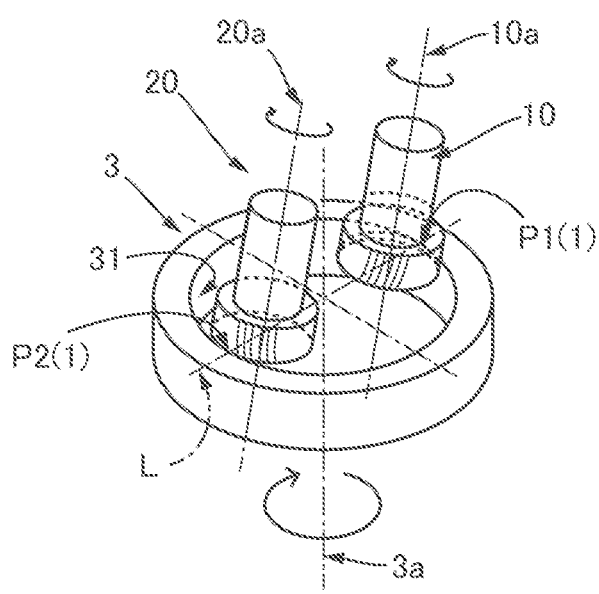
FIG. 3(a) is a diagram of an example of how a workpiece for an internally toothed gear is processed by the first and second skiving cutters in a step of performing coarse processing on the workpiece, 3(b) is a diagram of main processing conditions and right and left tooth flanks, 3(c) is a diagram showing how the first skiving cutter is arranged with respect to the surface to be cut when seen from the direction along the workpiece diameter line passing through the center of the first skiving cutter, and 3(d) is a diagram showing how the second skiving cutter is arranged with respect to the surface to be cut when seen from the direction along the workpiece diameter line passing through the center of the second skiving cutter.
Figure 3B:
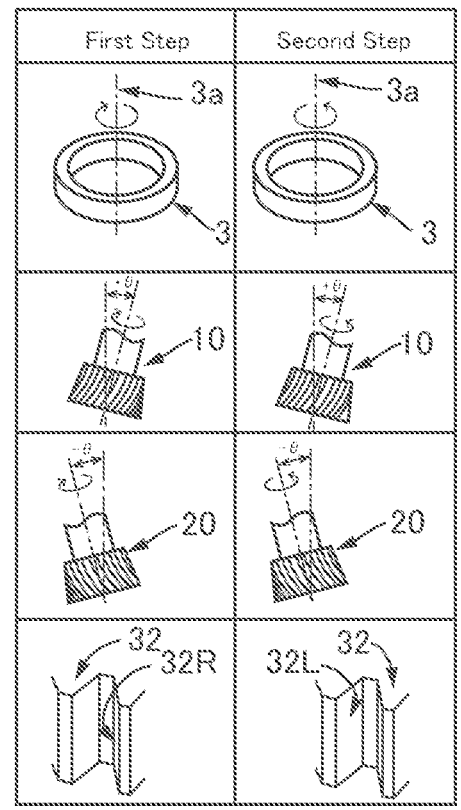
Figure 3C:
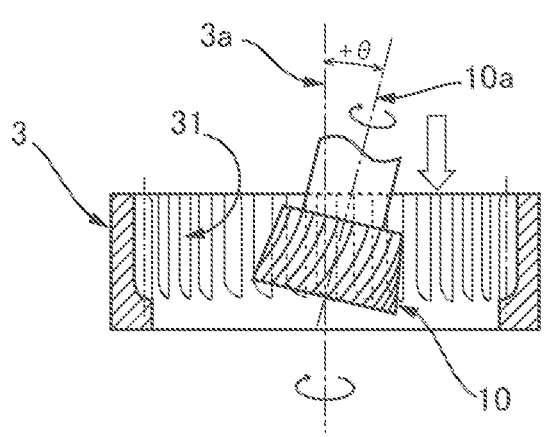
Figure 3D:
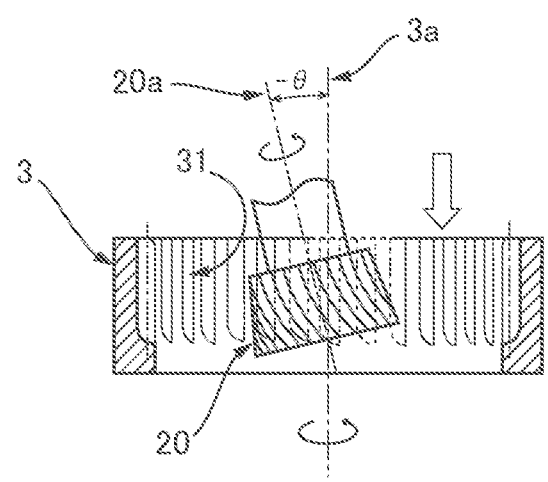
Figure 4:
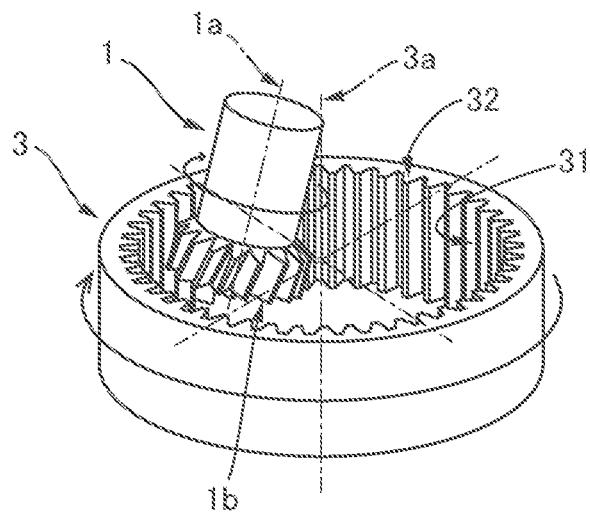
FIG. 4(a) is a diagram of an example of how a workpiece for an internally toothed gear is cut by a skiving cutter, and 4(b) is a simplified diagram of a skiving cutter and a workpiece.
Figure 4:
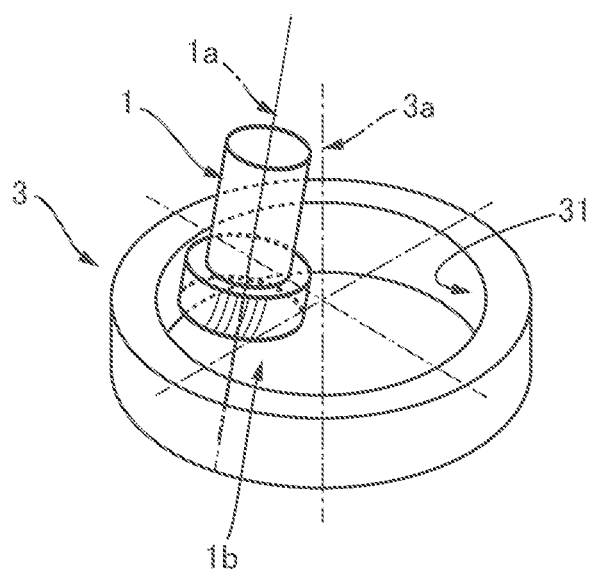

In the present example, cutters having opposite angles of torsion are used as the first and second skiving cutters 10, 20, as shown in FIG. 3(b). The axis crossing angle (first axis crossing angle) between the first skiving cutter 10 and the workpiece 3 is denoted as +θ, and the axis crossing angle (second axis crossing angle) between the second skiving cutter 20 and the workpiece 3 is denoted as −θ. In other words, the axis crossing angle between the rotation axis 3a of the workpiece 3 and a rotation axis 10a of the first skiving cutter 10 is +θ when the clockwise direction centered around the rotation axis 3a of the workpiece 3 is positive, as shown in FIG. 3(c). The axis crossing angle between the rotation axis 3a of the workpiece 3 and a rotation axis 20a of the second skiving cutter 20 is −θ, as shown in FIG. 3(d). In the first step, the rotation directions of the workpiece 3 and the first and second skiving cutters 10, 20 are clockwise. In the second step, the rotation directions of the workpiece 3 and the first and second skiving cutters 10, 20 are counterclockwise.

In this case, the parts of the internal teeth 32 where the right tooth flanks 32R are to be formed are cut mainly by the edge tip parts of the cutting edges of the clockwise-rotating first skiving cutter 10, these cutting edges coming into contact with the surface 31 to be cut of the workpiece 3 at an acute rake angle. By contrast, in the clockwise-rotating second skiving cutter 20, the edge tips of the cutting edges move along the surfaces of the parts cut by the first skiving cutter 10 and do not cut the surface 31 to be cut.

In the subsequent second step, the parts of the internal teeth 32 where the left tooth flanks 32L are to be formed are cut mainly by the edge tip parts of the cutting edges of the counterclockwise-rotating second skiving cutter 20, these cutting edges coming into contact with the surface 31 to be cut of the workpiece 3 at an acute rake angle. By contrast, in the counterclockwise-rotating first skiving cutter 10, the edge tips of the cutting edges move along the surfaces of the parts cut by the second skiving cutter 20 and do not cut the surface 31 to be cut.

In the tooth-cutting process, the first and second skiving cutters 10, 20 are positioned in positions separated from the surface 31 to be cut in the direction along the rotation axis 3a, in relation to the first and second processing positions P1(1), P2(2) on the diameter line L in the workpiece circumferential direction.

In the first step, the workpiece 3 and the first and second skiving cutters 10, 20 are caused to rotate synchronously clockwise, and the first and second skiving cutters 10, 20 are positioned in the workpiece diameter direction such that a predetermined depth of cut is achieved. In this state, the surface 31 to be cut of the workpiece 3 is cut and tooth grooves for the internal teeth 32 are created while the skiving cutters are fed at a predetermined rate in the direction along the rotation axis 3a of the workpiece 3, in relation to the surface 31 to be cut. The parts where the right tooth flanks 32R of the internal teeth 32 are to be formed are cut mainly by the first skiving cutter 10. The second skiving cutter 20 is not substantially involved in cutting.

In the second step, the workpiece 3 and the first and second skiving cutters 10, 20 are caused to rotate synchronously counterclockwise, and the first and second skiving cutters 10, 20 are positioned in the workpiece diameter direction such that a predetermined depth of cut is achieved. In this state, the surface 31 to be cut of the workpiece 3 is cut and tooth grooves for the internal teeth 32 are created while the skiving cutters are fed at a predetermined rate in the direction along the rotation axis 3a of the workpiece 3, in relation to the surface 31 to be cut. The parts where the left tooth flanks 32L of the internal teeth 32 are to be formed are cut mainly by the second skiving cutter 20. The first skiving cutter 10 is not substantially involved in cutting.

Next, in the tooth flank finishing step, which is the second tooth-cutting step, processing conditions are set as in the coarse processing step described above, and the first and second steps are performed. In the first step, a finishing process is carried out by the first skiving cutter 10 mainly on the right tooth flanks 32R of the internal teeth 32 created in the surface 31 to be cut via the first tooth-cutting step. In the second step, a finishing process is carried out by the second skiving cutter 20 mainly on the other left tooth flanks 32L.

In the gear skiving process method of the present example, the edge tips of the cutting edges of the first skiving cutter 10 come into contact with the right tooth flanks 32R at an acute rake angle, and the second skiving cutter 20 comes into contact with the left tooth flanks 32L at an acute rake angle. Therefore, the left and right tooth flanks can be processed with precision.

It is also possible to process internal teeth having a profile in which the left and right tooth flanks are different, as in the case shown in FIGS. 1 and 2, because the feed rate of the first and second skiving cutters 10, 20, the depth of cut, and other processing conditions can be independently controlled. In addition, because two first and second skiving cutters 10, 20 are used, edge tip wear of the cutting edges can be minimized to a greater extent than when a single cutter is used.

Other Embodiments

Although the above example relates to a tooth-cutting process for an internally toothed gear, it shall be apparent that the present invention can be similarly applied to a tooth-cutting process for an externally toothed gear.

The invention claimed is:

1. A gear skiving process method in which a tooth-cutting process is performed on a surface to be cut, which is either an external peripheral surface or an internal peripheral surface of a cylindrical workpiece, the gear skiving method comprising the steps of:

positioning a first skiving cutter at a first processing position in a circumferential direction on the surface to be cut of the workpiece such that a predetermined depth of cut is achieved;

positioning a second skiving cutter at a second processing position set apart by 180° in the circumferential direction from the first processing position on the surface to be cut such that a predetermined depth of cut is achieved;

disposing the first skiving cutter so as to be at a first axis crossing angle in relation to the workpiece, and disposing the second skiving cutter so as to be at a second axis crossing angle in relation to the workpiece; and performing a tooth-cutting process on the surface to be cut by one or both of the first and second skiving cutters, in which the first and second skiving cutters are fed simultaneously in a direction along a rotation axis of the workpiece while the workpiece and the first and second skiving cutters are caused to rotate synchronously, wherein the first skiving cutter and the second skiving cutter have opposite helix angles;

the first axis crossing angle and the second axis crossing angle are inclined in relation to the workpiece rotation axis by a same amount in opposite directions;

the tooth-cutting process performed on the surface to be cut includes a first step and a second step;

in the first step, the first and second skiving cutters are simultaneously fed in a direction along a workpiece center axis while the workpiece and the first and second skiving cutters are caused to rotate synchronously about respective axes thereof in a first direction, parts that are to be one set of tooth flanks among left tooth flanks and right tooth flanks of teeth to be created in the surface to be cut are cut by the first skiving cutter, and the second skiving cutter is not involved in cutting the surface to be cut; and in the second step, the first and second skiving cutters are simultaneously fed in the direction along the workpiece center axis while the workpiece and the first and second skiving cutters are caused to rotate synchronously about the respective axes thereof in a second direction opposite to the first direction, parts that are to be the other set of tooth flanks among the left tooth flanks and the right tooth flanks of the teeth to be created in the surface to be cut are cut by the second skiving cutter, and the first skiving cutter is not involved in cutting the surface to be cut.

* * * * *